UNITED STATES PATENT OFFICE.

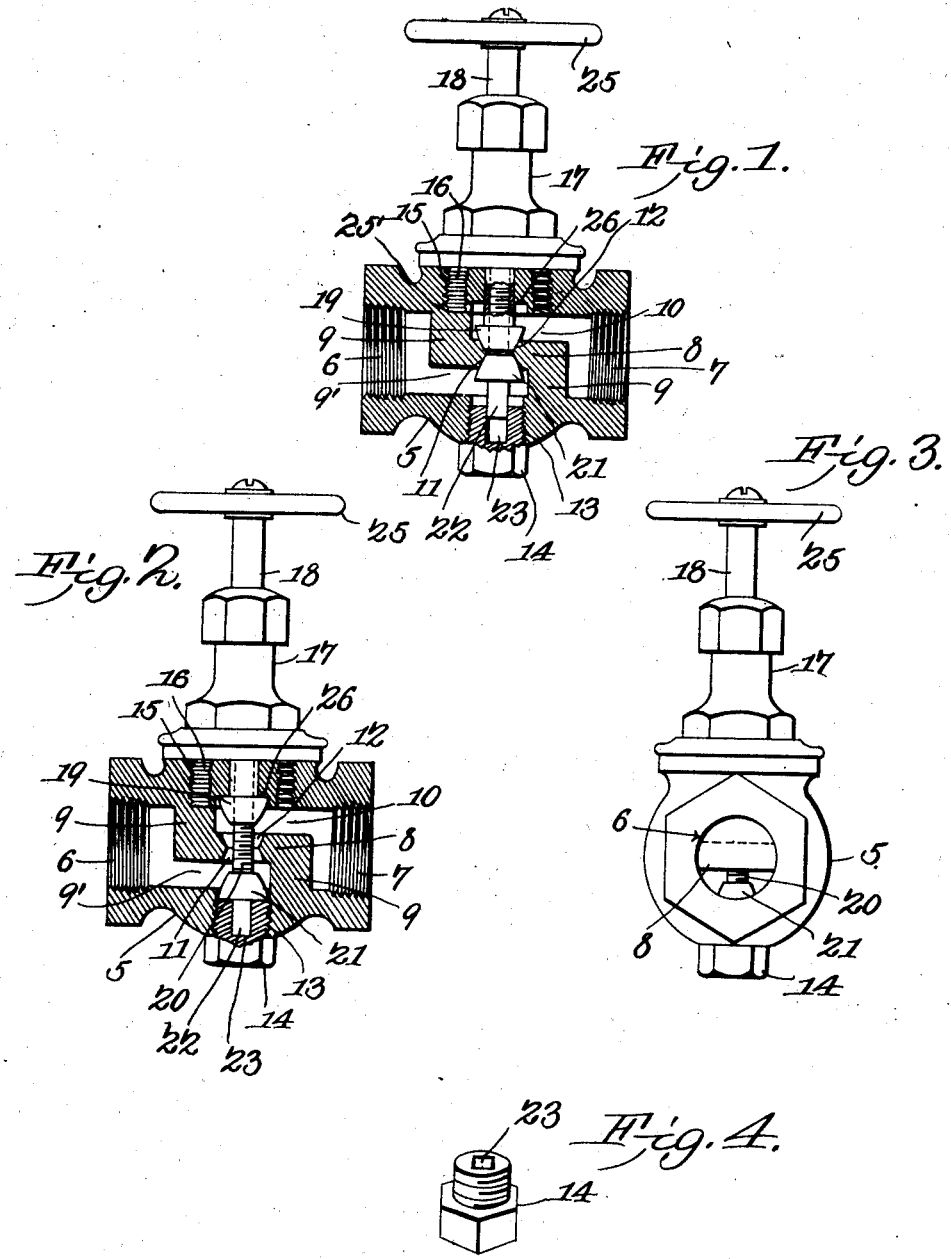

FRANCIS M. SMITH, OF COQUILLE, OREGON.

DOUBLE-SEATED VALVE.

No. 879,014.　　　　Specification of Letters Patent.　　　Patented Feb. 11, 1908.

Application filed August 27, 1906. Serial No. 332,266.

*To all whom it may concern:*

Be it known that I, FRANCIS M. SMITH, a citizen of the United States, residing at Coquille, in the county of Cook and State of Oregon, have invented a new and useful Double-Seated Valve, of which the following is a specification.

This invention relates to valves and has for its object to provide a comparatively simple and inexpensive device of this character by means of which the flow of liquid or other fluid through the valve casing may be conveniently and positively controlled.

A further object of the invention is to provide a main and auxiliary valve movable to open and closed position through the medium of a single operating means thereby to prevent leakage and dispense with the employment of auxiliary operating devices.

A further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claim.

In the accompanying drawings forming a part of this specification: Figure 1 is a longitudinal view of a valve constructed in accordance with my invention showing the same in closed position. Fig. 2 is a similar view showing the valve open. Fig. 3 is an end elevation. Fig. 4 is a detail perspective view of the removable cap or plug detached.

Similar numerals of reference indicate corresponding parts in all of the figures of the drawings.

The device consists of a casing 5 provided with inlet and discharge openings 6 and 7 the interior walls of which are threaded for connection with a fluid conducting pipe.

Arranged within the valve casing is a diaphragm 8 spaced from the adjacent interior walls of the casing by lateral arms 9 to form oppositely disposed fluid passages 9' and 10. The diaphragm 8 is formed with communicating valve seats 11 and 12 the walls of which are inclined in opposite directions and intersect at the center of the diaphragm, as shown. Formed in the casing 5 and disposed in alinement with the valve seats is a threaded opening 13 in which is seated a removable cap or plug 14.

The top of the casing is provided with a threaded opening 15 preferably of greater cross sectional diameter than the opening 13 and engaging the threads of the opening 15 is the reduced extension 16 of a gland 17 in which is mounted for vertical movement the tubular stem 18 of a main valve 19. The interior walls of the stem 18 are threaded for engagement with the correspondingly threaded stem 20 of an auxiliary valve 21, the latter being provided with a squared depending extension 22 the end of which is seated in a corresponding opening 23 formed in the plug or cap 14 as shown. The passages 9 and 10 communicate with the valve seats and also with the inlet and discharge openings, as shown, thus permitting the free passage of fluid through the casing when the valves are open. The free end of the valve stem 18 terminates in a hand-operated wheel 25 by means of which the main and auxiliary valves are moved to open and closed position. Attention is here called to the fact that the diaphragm projects inwardly from one wall of the opening 15 thereby to form a shoulder 25' which forms a stop and serves to limit the downward movement of the threaded extension 16.

In operation when it is desired to close the valve the wheel 25 is rotated which causes the valve 19 to engage the seat 12 and close the passage 10, a further rotation of the wheel 25 causing the auxiliary valve 21 to move vertically within the casing and engage the walls of the seat 11 thus effectually closing the valve and preventing the passage of fluid through the valve casing.

In order to open the valve it is merely necessary to rotate the hand wheel 25 in the opposite direction until the valve 19 engages the stop-shoulder 26 when a further movement of the hand-wheel will cause the auxiliary valve 21 to move downwardly to open position in engagement with the adjacent end 27 of the removable cap or plug 14. Attention is called to the fact that by having the auxiliary valve seated in the removable plug or cap said valve may be readily removed by unscrewing the cap thus permitting the operator to obtain access to the interior of the valve.

The valves may be made in different sizes and shapes and may be operated by a wheel, lever or other suitable device.

From the foregoing description it will be seen that there is provided an extremely simple, inexpensive, and efficient device admirably adapted for the attainment of the ends in view.

Having thus described the invention what is claimed is:

In a valve, a casing provided with oppositely disposed threaded openings of different sizes, a diaphragm disposed within the casing and provided with a square shoulder extending inwardly from one wall of the large opening, said diaphragm being provided with communicating valve seats having their walls inclined in opposite directions and intersecting at the center of the diaphragm, a removable cap threaded in the small opening in the casing and having a square recess formed therein, a conical-shaped main valve mounted for reciprocation within the casing and provided with a tubular stem the interior walls of which are threaded, an inverted conical-shaped auxiliary valve threaded in the stem of the main valve and provided with an angular extension seated in the recess of the removable cap, a plug threaded in the large opening in the casing and bearing against the square shoulder of the diaphragm, said plug being provided with a terminal recess for the reception of the main valve when the latter is moved to open position, the tubular stem of the main valve being extended beyond the threaded plug and provided with a hand operated device.

In testimony that I claim the foregoing as my own, I have hereto affixed my signature in the presence of two witnesses.

FRANCIS M. SMITH.

Witnesses:
 J. M. HAWKINS,
 JAMES WATSON.